(12) United States Patent
Juds et al.

(10) Patent No.: US 10,193,113 B2
(45) Date of Patent: Jan. 29, 2019

(54) VENT ADAPTER FOR LEAD-ACID BATTERY SYSTEMS

(71) Applicant: Johnson Controls Technology Company, Holland, MI (US)

(72) Inventors: Jeffrey H. Juds, Waukesha, WI (US); Joseph E. Liedhegner, Wauwatosa, WI (US)

(73) Assignee: Johnson Controls Techology Company, Auburn Hills, MI (US)

( * ) Notice: Subject to any disclaimer, the term of this patent is extended or adjusted under 35 U.S.C. 154(b) by 453 days.

(21) Appl. No.: 14/337,479

(22) Filed: Jul. 22, 2014

(65) Prior Publication Data
US 2015/0030892 A1 Jan. 29, 2015

Related U.S. Application Data

(60) Provisional application No. 61/858,370, filed on Jul. 25, 2013.

(51) Int. Cl.
*H01M 2/12* (2006.01)
*H01M 2/10* (2006.01)
*H01M 10/12* (2006.01)

(52) U.S. Cl.
CPC .......... *H01M 2/12* (2013.01); *H01M 2/1077* (2013.01); *H01M 10/12* (2013.01); *H01M 2220/20* (2013.01); *Y02E 60/126* (2013.01); *Y02P 70/54* (2015.11)

(58) Field of Classification Search
CPC ...... H01M 2/1077; H01M 10/12; H01M 2/12; H01M 2220/20
See application file for complete search history.

(56) References Cited

U.S. PATENT DOCUMENTS

| 2,330,669 | A | * | 9/1943 | Biles | H01M 2/1205 429/163 |
| 3,040,116 | A | * | 6/1962 | Gauvin | B63G 8/08 114/211 |
| 3,255,837 | A | * | 6/1966 | Wolf | B62D 12/02 180/14.2 |
| D250,531 | S | | 12/1978 | Demetreon | |

(Continued)

FOREIGN PATENT DOCUMENTS

CN 202339945 * 7/2012 ............ H01M 10/12
EP 0496539 B1 5/1996

(Continued)

OTHER PUBLICATIONS http://www.batteryweb.com/bci.cfm. "BCI Group Numbers, Dimensional Specifications, Polarity & Terminals". pp. 1-3.*

(Continued)

*Primary Examiner* — Jonathan Crepeau
*Assistant Examiner* — Angela J Martin
(74) *Attorney, Agent, or Firm* — Fletcher Yoder P.C.

(57) ABSTRACT

A vent adapter for a lead-acid battery includes a first side configured to mate with a vent port of the lead-acid battery via a first connector having a first geometry; and a second side in fluid communication with the first side and configured to mate with a vent passage of an automobile via a second connector having a second geometry, wherein the first and second geometries have respective shapes that are different from one another.

11 Claims, 6 Drawing Sheets

(56) References Cited

U.S. PATENT DOCUMENTS

| | | | |
|---|---|---|---|
| 4,286,028 A * | 8/1981 | Heiser | H01M 2/1217 429/82 |
| D290,597 S | 6/1987 | Sherman | |
| 4,740,178 A | 4/1988 | Badenhorst et al. | |
| D316,398 S | 4/1991 | Hill | |
| 5,390,636 A | 2/1995 | Baylor et al. | |
| 5,620,338 A | 4/1997 | Stephens et al. | |
| D380,730 S | 7/1997 | Green | |
| 5,660,587 A | 8/1997 | Baer | |
| 5,890,960 A | 4/1999 | Cronan et al. | |
| 6,025,086 A | 2/2000 | Ching | |
| 6,164,309 A | 12/2000 | Brecht | |
| 6,225,006 B1 * | 5/2001 | Kump | H01M 2/206 429/129 |
| D485,235 S | 1/2004 | Liang | |
| 6,932,650 B1 | 8/2005 | Freitag | |
| 7,094,496 B2 | 8/2006 | Rodriguez et al. | |
| 7,573,229 B2 * | 8/2009 | Arakelian | H01M 2/1072 320/107 |
| 8,394,519 B2 | 3/2013 | Naganuma | |
| 8,399,114 B2 | 3/2013 | Kishii et al. | |
| 8,652,666 B2 | 2/2014 | Kim | |
| 8,679,662 B2 | 3/2014 | Maguire et al. | |
| 8,748,021 B2 | 6/2014 | Lim | |
| 8,945,741 B2 | 2/2015 | Minami et al. | |
| 9,067,486 B2 | 6/2015 | Janarthanam et al. | |
| 9,159,970 B2 | 10/2015 | Watanabe et al. | |
| 9,203,068 B2 | 12/2015 | Utley et al. | |
| 9,231,237 B2 | 1/2016 | Shimizu et al. | |
| 9,537,130 B2 | 1/2017 | Yoon | |
| 2004/0074538 A1 | 4/2004 | Ortenzi et al. | |
| 2005/0166993 A1 * | 8/2005 | Viken | F01M 11/0458 141/98 |
| 2005/0284475 A1 | 12/2005 | Loescher | |
| 2007/0218351 A1 | 9/2007 | Boemer et al. | |
| 2010/0173181 A1 | 7/2010 | Okada | |
| 2010/0241470 A1 | 9/2010 | Smith | |
| 2012/0045672 A1 | 2/2012 | Kruger | |
| 2012/0094156 A1 * | 4/2012 | Lim | H01M 2/12 429/82 |
| 2012/0121949 A1 | 5/2012 | Eberhard et al. | |
| 2013/0040174 A1 | 2/2013 | Takasaki et al. | |
| 2013/0266826 A1 * | 10/2013 | Cowperthwaite | H01G 9/28 429/7 |
| 2014/0329142 A1 * | 11/2014 | Dickinson | H01M 4/04 429/211 |
| 2015/0030892 A1 * | 1/2015 | Juds | H01M 2/1077 429/53 |
| 2015/0093607 A1 | 4/2015 | Kuriyama et al. | |
| 2015/0093982 A1 | 4/2015 | Bailey | |
| 2015/0125720 A1 | 5/2015 | Fuji et al. | |
| 2015/0162578 A1 | 6/2015 | Kim et al. | |
| 2015/0162582 A1 | 6/2015 | Metz et al. | |
| 2015/0207186 A1 | 7/2015 | Schmidt et al. | |
| 2015/0214525 A1 | 7/2015 | Lim | |
| 2015/0236325 A1 | 8/2015 | Miller et al. | |
| 2015/0246650 A1 | 9/2015 | Nakajima et al. | |
| 2016/0020447 A1 | 1/2016 | Janarthanam et al. | |
| 2016/0218338 A1 | 7/2016 | Iqbal et al. | |
| 2016/0308179 A1 | 10/2016 | Lohr et al. | |

FOREIGN PATENT DOCUMENTS

| | | |
|---|---|---|
| KR | 1996-0006034 | 7/1996 |
| KR | 10-0748737 | 8/2007 |
| WO | 2000057502 A1 | 9/2000 |
| WO | 2003050907 A1 | 6/2003 |
| WO | 2010072058 A1 | 7/2010 |
| WO | 2013110359 A1 | 8/2013 |

OTHER PUBLICATIONS

Porsche 996 DIY: Battery Replacement; http://www.euroaddiction.net/forum/996-997-turbo-diy-how-section/6180-porsche-996-diy-battery-replacement.html; Apr. 27, 2011; 12 pgs.

Boxster Batteries; "Dead Battery and Can't Get in to Charge it?"; https://sites.google.com/site/mikefocke2/batteries; (unknown date); 15 pgs.

Concord Battery Company; Elbow barbed coupling assy, 1/4 to 1/2; http://www.concordebattery.com/pdfs/5-0349.pdf; (unknown date); 1 pg.

Concord Battery Company; Elbow, vent adapter, 3/8"x1/2"; http://www.concordebattery.com/pdfs/8003.pdf; (unknown date); 1 pg.

Battery Council International; "Batter Replacement Data Book—2013 Edition"; 21 pgs.

East Penn Manufacturing Co. Inc., "Valve-Regulated Lead-Acid (VRLA)" Gelled Electrolyte (Gel) and Absorbed Glass Mat (AGM) Batteries; (2012); 7 pgs.

International Search Report & Written Opinion for International Application No. PCT/US2014/048044 dated Dec. 3, 2014.

KR 10-2016-7001603 Preliminary Rejection dated May 22, 2017.

CN 201480052561.4 Office Action dated Jun. 16, 2017.

* cited by examiner

VENT ADAPTER FOR LEAD-ACID BATTERY SYSTEMS

CROSS-REFERENCE TO RELATED APPLICATIONS

This application claims priority from and the benefit of U.S. Provisional Application Ser. No. 61/858,370, entitled "BATTERY VENT PORT DESIGNS," filed Jul. 25, 2013, which is incorporated by reference herein in its entirety for all purposes.

BACKGROUND

The present disclosure relates generally to the field of batteries and battery modules. More specifically, the present disclosure relates to batteries that may be used in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Batteries, as they are used today, come in a variety of forms. From packs of alkaline batteries purchased at supermarkets to large banks of electrochemical cells capable of powering houses or even spacecrafts, batteries can differ in shape, size, electrical characteristics, and so forth. The ubiquity of batteries as power storage devices is owed, at least in part, to the ability of batteries to be connected to one another in a variety of ways to achieve different power profiles, their scalability, and the reliable nature of the electrochemical cell as a power storage and retrieval solution.

As one specific example, lead-acid batteries have been used for decades in vehicles, and a number of different shapes and sizes have been developed for such batteries in an effort to meet certain power and spatial requirements. Despite these differences in size, shape, and power ratings, many lead-acid batteries include similar features. For example, lead-acid automotive batteries generally include two or more terminals, are generally connected to the same types of components (e.g., alternator, starter), and generally operate on the same electrochemical principles (the redox reactions of lead).

Because of the wide applicability and associated variation in sizes, shapes, and power ratings of batteries, consumers (e.g., distributors, storefronts, auto shops) must ensure that a particular battery meets the requirements of a particular application. For example, a person wanting to replace their vehicle battery must ensure that the replacement battery matches the appropriate specifications established for their vehicle. For this reason, there are a number of standards that specify certain aspects of lead acid batteries (and other standards that may be associated with other types of batteries). These standards enable both manufacturers and consumers to determine whether a particular battery is appropriate for a particular application. For example, the standards may establish limits, ranges, tolerances, etc., for lead-acid batteries relating to dimensions of the battery's housing, number and arrangement of electrochemical cells, the terminals (e.g., locations, shape, and size), the battery's cold cranking performance and charge retention, and how the battery may be retained within the vehicle, among others. As non-limiting examples, standards widely accepted and understood for automobiles and other vehicle applications include Battery Council International (BCI) group numbers, Deutsche Industrie Normen (DIN codes), and European Norm (EN) codes. Each of these group numbers or codes may be considered to specify a particular set of requirements for a lead-acid battery.

While these standards are very helpful to ensure the compatibility of a particular battery with a particular application, this not only requires the purchaser to seek out a particular type of battery (e.g., a battery that accords with a BCI, DIN, and/or EN number), but also typically requires the point-of-purchase to carry a large stock of different battery types. For instance, an automotive specialty store might stock large quantities of batteries of varying group number requirements to meet the needs of various consumers.

In accordance with an aspect of the present disclosure, it is now recognized that it may be desirable to meet a variety of application requirements using a reduced number of battery types. Indeed, it is also recognized that it may be desirable for a single battery type to be compatible with multiple battery type applications.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure relates to batteries and battery modules. More specifically, the present disclosure relates to lead-acid battery vent adapter components and systems.

For example, in one embodiment, a vent adapter for a lead-acid battery includes: a first side configured to mate with a vent port of the lead-acid battery via a first connector having a first geometry; and a second side in fluid communication with the first side and configured to mate with a vent passage of an automobile via a second connector having a second geometry, wherein the first and second geometries have respective shapes that are different from one another.

As another example, in an embodiment, a battery system includes a lead-acid battery comprising: a housing; a plurality of lead-acid battery cells disposed within the housing; and a vent port in the housing configured to vent gases evolved from the plurality of lead-acid battery cells; and a vent adapter configured to fluidly couple the vent port with a vent connector having a different geometric shape, comprising: a first connector substantially matched in shape and size with the vent port to enable an interference fit between the vent port and the first connector; and a second connector having a different shape than the vent port of the lead acid battery.

As a further example, in another embodiment, a system includes a lead-acid battery installed within a vehicle, comprising: a housing a plurality of lead-acid battery cells disposed within the housing and being electrically coupled to the vehicle via two or more terminals of the lead-acid battery; and a vent port in the housing, the vent port being fluidly coupled to a vent passage of the vehicle via a vent adapter, wherein the vent adapter is directly coupled to the vent port at a first end and is directly coupled to the vent passage of the vehicle at a second end, and the first and second ends of the vent adapter have different geometric shapes.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As set forth above, there are a number of accepted standards that specify certain aspects of lead-acid batteries, including but not limited to Battery Council International (BCI) group numbers, Deutsche Industrie Normen (DIN) codes, European Norm (EN) codes, Japanese Industry Standard (JIS) codes, Society of Automotive Engineers (SAE) designations, and so forth. Further, there may be a number of other features of lead-acid batteries that are not necessarily controlled by these standards, but, by virtue of the constraints on manufacture associated with the group requirements, are generally associated with a particular location on the batteries, and may generally be associated with a particular size and/or shape.

While manufacturing, stocking, and selling these different sizes of batteries enables manufacturers and storefronts to provide batteries for a wide variety of applications, it is now recognized that it may be desirable to enable greater flexibility for particular types of batteries (e.g., lead-acid automotive batteries) to be suitable for a number of different applications. For example, it is now recognized that enabling compatibility between batteries meeting certain standards that are sufficiently close from a power and spatial (e.g., form factor) standpoint may reduce the number of batteries that need to be manufactured, stocked, and sold, thereby increasing manufacture throughput and greater consumer confidence.

In accordance with the present disclosure, for example, it is now recognized that a first lead-acid battery type may be used in place of another lead-acid battery type using one or more adapter features (e.g., a vent adapter) coupled to the first lead-acid battery type, where the one or more adapter features are configured to mimic a structural feature (e.g., a vent port) of the second battery type by changing the geometry (shape) of the structural feature. For example, the dimensions and power performance of two different lead-acid battery types belonging to different group standards may be similar, but they may have one or more features (e.g., connectors, protrusions, hoses) that are different. One such feature may include the vent ports of the different lead-acid battery types, where the different vent ports enable the release of vent gases from their respective battery, but are different in configuration (e.g., shape, size). In accordance with an aspect of the present disclosure, an adapter may have a first portion configured to interface with a vent port of a first battery type, the vent port having a first geometry (shape and size), and may have a second portion having a second geometry different from the first and having substantially the same configuration (e.g., geometry, dimensions) as a vent port of a second battery type. In this way, when the adapter is coupled to the vent port of the first battery type, the resulting configuration (e.g., vent port shape) is as if the second battery type were present, and various venting features of the application (e.g., vent hoses) may be connected thereto. Specific examples of battery groups and associated adapters are discussed in further detail below.

For example, in one aspect of the present disclosure and as discussed in detail below with respect to FIGS. 3-7, batteries that are suitable for BCI group 65 applications, referred to herein as group 65 batteries, and batteries that are suitable for BCI group 66 applications, referred to herein as group 66 batteries, have dimensions (length, width, height) that are substantially the same. Specifically, BCI group 65 and 66 dimensional requirements only differ by approximately 2 millimeters in one direction (i.e., in their height), and the power requirements of BCI groups 65 and 66 substantially overlap from a cold cranking performance and capacity standpoint. However, their vent ports have a different shape and size. It is now recognized that an adapter may be placed onto the group 65 battery's vent port to enable the group 65 battery to vent as if it were a group 66 battery, where the adapter results in a change in the shape (i.e., more than simply a change in size) of the vent port.

In another aspect of the present disclosure and as discussed in detail below with respect to FIGS. 8-11, batteries that are suitable for BCI group 24F applications, referred to herein as group 24F batteries, may be fitted with an adapter to enable the group 24F battery to be compatible with other vent designs, such as locking key vent designs. In this respect, it is now recognized that, generally, group batteries compatible with other applications but for their vent design (vent port size and shape) may be fitted with specially-configured adapters to enable the use of the group batteries in the other applications.

In a further aspect of the present disclosure and as discussed in detail below with respect to FIGS. 12 and 13, batteries that are suitable for BCI group 31 applications, referred to herein as group 31 batteries, may be fitted with an adapter to enable the group 31 battery to vent at an alternative location. Indeed, it is now recognized that the vent position, vent shape, and vent size of a particular group battery may be adjusted using the type of adapters described herein. Discussed below are example implementations of batteries subject to the embodiments described herein, as well as a brief description of various aspects of lead-acid batteries that are pertinent to the present disclosure.

Figure 1:
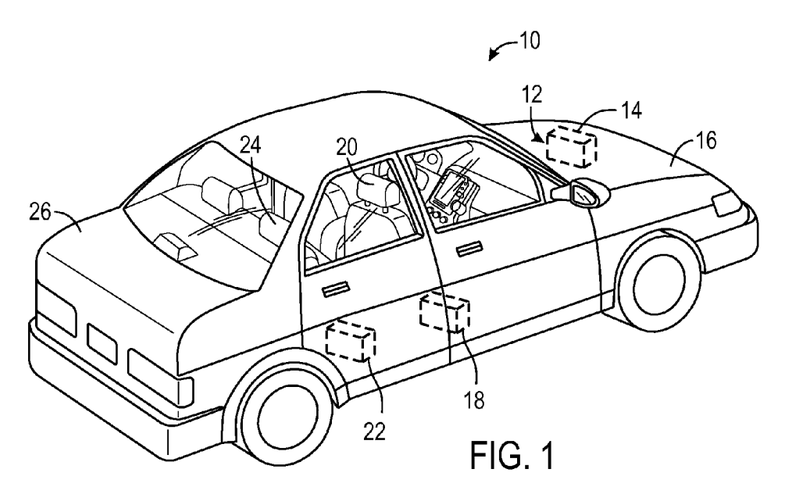
FIG. 1 is a perspective view of a vehicle having a battery system contributing all or a portion of the power for the vehicle, in accordance with an embodiment of the present approach.

Referring to FIG. 1, a perspective view of a vehicle 10 is provided, which includes a number of possible locations for one or more batteries 12 subject to the present embodiments. In accordance with present embodiments, the vehicle 10 may be any type of vehicle that utilizes a battery that vents, including but not necessarily limited to lead-acid batteries. Indeed, the vehicle 10 is intended to represent any number and variety of vehicles that may utilize venting batteries. While the present embodiments are described in the context of lead-acid batteries conforming to a particular standard (e.g., BCI, DIN, EN, SAE, JIS codes), they are also intended to apply to any type of battery and any type of vehicle or other application.

As depicted, the one or more batteries 12 may be positioned at different locations within the vehicle 10. For instance, a first battery 14 may be located at a forward section of the vehicle 10 underneath a hood 16, a second battery 18 may be located underneath a front seat 20, such as a passenger seat, or a third battery 22 may be located underneath a rear seat 24 or within a trunk 26 of the vehicle 10. While the terms "first," "second," and "third" are used herein, this is only to facilitate reference to the different possible battery locations. Indeed, it is within the scope of the present disclosure for the vehicle 10 to only include, as an example, the second battery 18 underneath the front seat 20. As another example, it is within the scope of the present disclosure for the vehicle 10 to only include the third battery 22 underneath the rear seat 24 or within the trunk 26. Any combinations and locations of different batteries are therefore encompassed by the present disclosure.

In accordance with an aspect of the present disclosure, any one or a combination of the first, second, or third batteries 14, 18, 22 may be fitted with an adapter to enable them to be used in the vehicle 10. For instance, the first, second, or third batteries 14, 18, 22 may have certain structural features (e.g., vent ports) that are not compatible with their desired placement within the vehicle 10 (e.g., do not have a compatible shape and size with corresponding connectors of the vehicle 10). In one embodiment, an adapter may be fitted onto the first, second, or third batteries 14, 18, 22 to enable them to properly interface with corresponding vehicle components.

Figure 2:
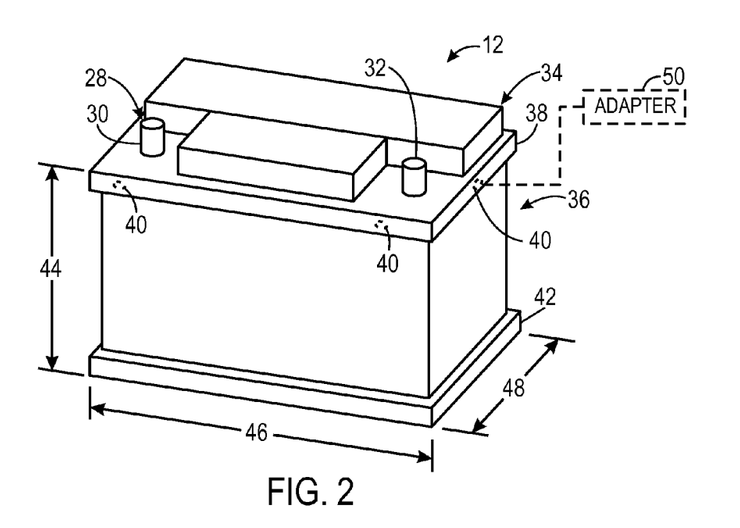
FIG. 2 is a schematic representation of an embodiment of a lead-acid battery having one or more vent ports that may be used in combination with a vent adapter, the vent adapter being configured to adapt the geometry of the vent ports for use in an otherwise incompatible application in accordance with an embodiment of the present approach.

An example embodiment of one of the batteries 12 is depicted in FIG. 2. In particular, the battery 12 shown in the perspective view of FIG. 2 is intended to represent a lead-acid battery that may include any number of lead-acid electrochemical cells connected to one another in any configuration. That is, the battery 12 of FIG. 2 may have any voltage and any capacity suitable for any lead-acid battery application. More specifically, the battery 12 may be a battery suitable for a particular BCI group application, but not necessarily suitable for other BCI group applications due to incompatible structural and/or power component features.

The illustrated battery 12 includes two terminals 28, including a first terminal 30 (e.g., a positive terminal) and a second terminal 32 (e.g., a negative terminal), though other embodiments of the battery 12 may include more than two terminals 28. The terminals 28 are illustrated as being cylindrical, but may generally be of any form and size. For example, the terminals 28 may include, but are not limited to, SAE posts, DIN posts, EN/JIS posts, JIS pencil posts, threaded posts, flat terminals having different shapes, and the like, or any combination thereof. The terminals 28, in general, are electrically connected to at least one lead-acid electrochemical cell (also referred to as lead-acid battery cells, lead-acid cells, and the like), for example to positive and negative plates of the same or different lead-acid electrochemical cells. The terminals 28 enable the battery 12 to provide power to one or more components of the vehicle 10 by enabling a physical connection to corresponding connectors of the vehicle 10.

The battery 12 also includes a housing 34, which may be of any geometry and dimensions in accordance with any BCI group, EN, JIS, or DIN standard, or any other standard. As depicted, the housing 34 includes a body 36, which houses various internal components such as the lead-acid electrochemical cells, electrochemical cell interconnects, and other electrical and/or mechanical components. The housing 34 also includes a cover 38 positioned atop the body 36 in the illustrated configuration, though the cover 38 may have a different relative position depending on the arrangement of the battery 12 within the vehicle 10 (e.g., on its side). The cover 38 may be secured to the body 36 via any appropriate technique, such as snap-fitting, welding (e.g., ultrasonic, laser), adhesives, sealants, and so forth. The housing 34 of the battery 12 will generally determine the form factor of the battery 12, while the electrochemical cells determine the power performance of the battery 12.

In this regard, the battery 12 may be any lead-acid battery type, including a flooded battery or a valve-regulated lead-acid (VRLA) battery, and the difference between these may be better appreciated with reference to their operation. As may be appreciated, all lead-acid batteries include lead-acid electrochemical cells, which each include a positive plate and a negative plate. The plates each include lead (Pb), and generally differ in terms of how much lead is present in its different oxidation states (Pb(s), $Pb^{2+}$, and $Pb^{4+}$). The electrochemical reactions of lead in the battery 12 are facilitated using aqueous sulfuric acid ($H_2SO_4(aq)$) as an electrolyte.

One difference between flooded lead-acid batteries and VRLA batteries is that the sulfuric acid is less mobile and therefore less likely to spill in VRLA batteries. VRLA batteries may be of two different types, including gelled electrolyte (gel) and absorbed glass mat (AGM) batteries. Gelled electrolyte batteries generally include a solid (e.g., silica, $SiO_2$) mixed with the sulfuric acid, and AGM batteries generally include a separator (e.g., a fiberglass mat) wrapped around one of the plates (generally the positive plate), and the mat includes a high level of absorbance of the sulfuric acid electrolyte used in the electrochemical cells. For this reason, gel and AGM batteries may be placed in a number of orientations without losing significant amounts of water as a result, while flooded batteries are generally maintained in an upright position.

Some of the electrochemical reactions during charging and/or discharging of all of the lead-acid batteries may evolve gases, such corrosive gases, hydrogen ($H_2$), and oxygen ($O_2$). Indeed, if the battery is overcharged, hydrogen and oxygen may be generated from the electrolysis of water. Thus, if this gas evolution remains unmitigated, all lead-acid batteries will lose water.

In this regard, another difference between flooded and VRLA batteries is that VRLA batteries generally include features configured to enable recombination of the hydrogen with oxygen at the negative plate, which replenishes water that would otherwise be lost to the battery by venting. For example, a VRLA battery may include a one-way pressure relief valve that enables the battery 12 to hold a pressure sufficient to encourage recombination of the oxygen and hydrogen at the negative plate. Flooded lead-acid batteries, on the other hand, may generally require refilling with water as a regular maintenance procedure because this one-way valve, and associated regeneration of water, may not be present.

The reaction to regenerate the water in VRLA batteries is commonly referred to as a recombination reaction. However, at times, the generation of the gases may be faster than the recombination reaction, which may cause pressure buildup and opening of the one-way valve. This means that the VRLA batteries may also lose some amount of water due to associated venting of hydrogen and oxygen. Thus, essentially every lead-acid battery may undergo at least some venting, and for this reason, the battery 12 will essentially always include some sort of vent port 40 configured to enable the venting of gases and thereby mitigate damage to the battery 12. Aspects of the present embodiments are directed toward the adaptation of the vent port 40 for different battery applications (e.g., different group applications).

The cover 38 may include one or more of the vent ports 40, which are illustrated as vent holes but may be protrusions or any other appropriate venting feature. In certain configurations, the battery 12 may also include a base 42 that is separate from the body 36 of the housing 34, and which may also be of any geometry and dimensions. The base 42 may have the same or different dimensions relative to the body 36 and the cover 38. Further, in certain embodiments, the base 42 may be referred to as a hold-down feature of the battery 12, which enables the battery 12 to be secured in its location within the vehicle 10. In some embodiments, the base 42 may be separate from the battery 12, and may not necessarily be present. In other words, in some embodiments, the battery 12 may not include the base 42, and the bottom of the battery 12 may instead correspond to a surface of the body 36 (e.g., opposite the cover 38).

Together, the cover 38, the body 36, and, when present, the base 42 of the housing 34 determine a height 44, a length 46, and a width 48 of the battery 12. In one aspect of the present disclosure, the height 44, or the length 46, or the width 48, or any combination thereof, may comply with one or more battery group standards set forth in, for example, BCI, DIN, EN, SAE, or JIS codes. In certain aspects of the present disclosure, for example, the height 44, the length 46, the width 48, and the other components of the battery 12 may comply with BCI group 65, 24F, or 31 standards, but may be sufficiently close to other BCI group standards. In accordance with certain embodiments, the group 65 battery, group 24F battery, or group 31 battery may be fitted with a vent port adapter 50 configured to enable the particular battery to be used in a greater number of applications than would otherwise be appropriate.

The term "applications," as used herein, is intended to denote applications where a particular set of standards have been established and that are met by a particular group of batteries. For example, a group 65 battery may be considered to meet a group 65 application, a group 24F battery may be considered to meet a group 24F application, and a group 31 battery may be considered to meet a group 31 application, where the group notations are established by the BCI group number associated with the particular designation. Thus, in accordance with an aspect of the present embodiments, the adapter 50 enables, for example, a group 65 battery to be compatible with group applications other than group 65 applications, such as group 66 applications.

The adapter 50 may similarly enable compatibility between other battery groups and group applications, depending on its particular configuration (e.g., geometry, dimensions). Whether a particular group battery may be fitted with an adapter to enable compatibility with other group applications is dependent upon, among other things, the dimensions (e.g., size, form factor) of the battery 12, the number, size, and arrangement of its lead-acid electrochemical cells, its terminal locations and shape, vent port sizes, shapes, and locations, and the corresponding requirements of the group application in question. Indeed, as noted above, BCI group 65 and 66 dimensional requirements only differ by approximately 2 millimeters in one direction (i.e., in their height), and the power requirements of BCI groups 65 and 66 substantially overlap from a cold cranking performance and capacity standpoint. One main difference between these groups that prevents their inherent compatibility is the particular configuration (shape, size) of their vent ports. As set forth in further detail below with respect to FIGS. 3-7, certain embodiments of the adapter 50 overcome this limitation.

As will be appreciated, the Battery Council International (BCI) is a trade association that sets certain standards for vehicle batteries. A number of battery groups and sizes have been specified by the BCI. While the present embodiments are applicable to all different standards, tabulated below are a number of specifications set forth for a variety of BCI groups, which are provided herein for reference. Further, to the extent that the values set forth below may not agree with the standards specified by the BCI, the BCI (or other) standards are incorporated herein by reference in their entirety. Additional information regarding BCI battery standards, technical specifications and replacement is available in the BCI Battery Technical Manual and the BCI Battery Replacement Data Book, both available from BCI of Chicago, Ill. In regard to Table 1 below, it is within the scope of the present disclosure for an adapter configured in accordance with any one or a combination of the embodiments described herein to be used with any one or a combination of the listed group numbers. Specifically, adapters 50 configured in accordance with present embodiments may be used to render any one or a combination of the BCI group batteries set forth below suitable for use in another BCI group number application, provided that the dimensions and power requirements of one BCI group number (e.g., a first group designation) and the other BCI group number (e.g., a second group designation) and are sufficiently compatible.

As discussed herein, in some embodiments, adapters 50 in accordance with present embodiments may be used when the first and second group designations have dimensions that differ by no more than 10% in the length, width, and/or height direction. For example, the group designations may have dimensions that differ by between approximately 10% and approximately 0.1% in the length, width, and/or height direction. However, to the extent that the group designations include maximum dimensional requirements, it should be noted that, in other embodiments, a first battery having a first group designation may have a much smaller form factor but may still be appropriate for a second group designation, provided that the power specifications of the first battery are sufficient for the power requirements of the second group designation. In such embodiments, various housing size adapters, shims, and so forth may be used to more closely conform to existing mounting structures. The adapter 50 of the present embodiments may be provided in combination with other such adapters, for example with a new battery, or as a kit. For instance, a kit may include the adapter 50 and a lead-acid battery in combination for replacing an existing battery. Indeed, housing adapters and those of the present disclosure (adapters 50) may be used in combination with lead acid batteries having an irregular (e.g., not polygonal) shape.

TABLE 1

Selected BCI Group Numbers and Associated Dimensional and Power Specifications

| BCI Group Number | Maximum Overall Dimensions | | | | | | O.E. Performance Ranges | |
|---|---|---|---|---|---|---|---|---|
| | Millimeters | | | Inches | | | Cold Cranking Performance | Reserve Capacity |
| | L | W | H | L | W | H | Amps. @ 0° F. (−18° C.) | Minutes @ 80° F. (27° C.) |
| Passenger Vehicle Batteries (12 Volt, 6 Cell) | | | | | | | | |
| 21 | 208 | 173 | 222 | $8^{3}/_{16}$ | $6^{13}/_{16}$ | $8^{3}/_{4}$ | 305-420 | 50-70 |
| 21R | 208 | 173 | 222 | $8^{3}/_{16}$ | $6^{13}/_{16}$ | $8^{3}/_{4}$ | 310-490 | 50-70 |
| 22 F | 241 | 175 | 211 | $9^{1}/_{2}$ | $6^{15}/_{16}$ | $8^{5}/_{16}$ | 230-500 | 45-90 |
| 22HF | 241 | 175 | 229 | $9^{1}/_{2}$ | $6^{15}/_{16}$ | 9 | 290 | 69 |
| 22NF | 240 | 140 | 227 | $9^{7}/_{16}$ | $5^{1}/_{2}$ | $8^{15}/_{16}$ | 165-500 | 50-60 |
| 24 | 260 | 173 | 225 | $10^{1}/_{4}$ | $6^{13}/_{16}$ | $8^{7}/_{8}$ | 200-900 | 50-95 |
| 24 F | 273 | 173 | 229 | $10^{3}/_{4}$ | $6^{13}/_{16}$ | 9 | 250-710 | 50-95 |
| 24H | 260 | 173 | 238 | $10^{1}/_{4}$ | $6^{13}/_{16}$ | $9^{3}/_{8}$ | 325-410 | 70-95 |
| 24R | 260 | 173 | 229 | $10^{1}/_{4}$ | $6^{13}/_{16}$ | 9 | 550 | 70-95 |
| 24T | 260 | 173 | 248 | $10^{1}/_{4}$ | $6^{13}/_{16}$ | $9^{3}/_{4}$ | 380-500 | 110 |
| 25 | 230 | 175 | 225 | $9^{1}/_{16}$ | $6^{15}/_{16}$ | $8^{7}/_{8}$ | 260-550 | 50-90 |
| 26 | 208 | 173 | 197 | $8^{3}/_{16}$ | $6^{13}/_{16}$ | $7^{3}/_{4}$ | 245-525 | 50-80 |
| 26R | 208 | 173 | 197 | $8^{3}/_{16}$ | $6^{13}/_{16}$ | $7^{3}/_{4}$ | 235-540 | 60-80 |
| 27 | 306 | 173 | 225 | $12^{1}/_{16}$ | $6^{13}/_{16}$ | $8^{7}/_{8}$ | 340-810 | 102-140 |
| 27 F | 318 | 173 | 227 | $12^{1}/_{2}$ | $6^{13}/_{16}$ | $8^{15}/_{16}$ | 315-710 | 95-140 |
| 27H | 298 | 173 | 235 | $11^{3}/_{4}$ | $6^{13}/_{16}$ | $9^{1}/_{4}$ | 420-440 | 125 |
| 29NF | 330 | 140 | 227 | 13 | $5^{1}/_{2}$ | $8^{15}/_{16}$ | 300-430 | 95 |
| 33 | 338 | 173 | 238 | $13^{5}/_{16}$ | $6^{13}/_{16}$ | $9^{3}/_{8}$ | 1050 | 165 |
| 34 | 260 | 173 | 200 | $10^{1}/_{4}$ | $6^{13}/_{16}$ | $7^{7}/_{8}$ | 375-800 | 100-115 |
| 34R | 260 | 173 | 200 | $10^{1}/_{4}$ | $6^{13}/_{16}$ | $7^{7}/_{8}$ | 450-700 | 110 |
| 35 | 230 | 175 | 225 | $9^{1}/_{16}$ | $6^{15}/_{16}$ | $8^{7}/_{8}$ | 310-640 | 80-110 |
| 36R | 263 | 183 | 206 | $10^{3}/_{8}$ | $7^{3}/_{16}$ | $8^{1}/_{8}$ | 540-650 | 130 |
| 40R | 278 | 175 | 175 | 11 | $6^{15}/_{16}$ | $6^{15}/_{16}$ | 590-650 | 110-120 |
| 41 | 293 | 175 | 175 | $11^{9}/_{16}$ | $6^{15}/_{16}$ | $6^{15}/_{16}$ | 300-720 | 65-95 |
| 42 | 242 | 175 | 175 | $9^{9}/_{16}$ | $6^{15}/_{16}$ | $6^{15}/_{16}$ | 210-650 | 65-95 |
| 43 | 334 | 175 | 205 | $13^{1}/_{8}$ | $6^{15}/_{16}$ | $8^{1}/_{16}$ | 375-495 | 115 |
| 45 | 240 | 140 | 227 | $9^{7}/_{16}$ | $5^{1}/_{2}$ | $8^{15}/_{16}$ | 400-500 | 60-80 |
| 46 | 273 | 173 | 229 | $10^{3}/_{4}$ | $6^{13}/_{16}$ | 9 | 315-450 | 75-95 |
| 47 | 242 | 175 | 190 | $9^{9}/_{16}$ | $6^{15}/_{16}$ | $7^{1}/_{2}$ | 290-650 | 75-85 |
| 48 | 278 | 175 | 190 | 11 | $6^{15}/_{16}$ | $7^{1}/_{2}$ | 315-770 | 85-95 |
| 49 | 353 | 175 | 190 | 1315/16 | $6^{15}/_{16}$ | $7^{1}/_{2}$ | 470-950 | 140-150 |
| 50 | 343 | 127 | 254 | $13^{1}/_{2}$ | 5 | 10 | 500-600 | 85-100 |
| 51 | 238 | 129 | 223 | $9^{3}/_{8}$ | $5^{1}/_{16}$ | $8^{3}/_{4}$ | 270-435 | 70 |

TABLE 1-continued

Selected BCI Group Numbers and Associated Dimensional and Power Specifications

| BCI Group Number | Maximum Overall Dimensions | | | | | | O.E. Performance Ranges | |
|---|---|---|---|---|---|---|---|---|
| | Millimeters | | | Inches | | | Cold Cranking Performance | Reserve Capacity |
| | L | W | H | L | W | H | Amps. @ 0° F. (−18° C.) | Minutes @ 80° F. (27° C.) |
| 51R | 238 | 129 | 223 | 9$\frac{3}{8}$ | 5$\frac{1}{16}$ | 8$\frac{3}{4}$ | 310-435 | 70 |
| 52 | 186 | 147 | 210 | 7$\frac{5}{16}$ | 5$\frac{13}{16}$ | 8$\frac{1}{4}$ | 405 | 70 |
| 53 | 330 | 119 | 210 | 13 | 4$\frac{11}{16}$ | 8$\frac{1}{4}$ | 210-315 | 40 |
| 54 | 186 | 154 | 212 | 7$\frac{5}{16}$ | 6$\frac{1}{16}$ | 8$\frac{3}{8}$ | 305-330 | 60 |
| 55 | 218 | 154 | 212 | 8$\frac{9}{16}$ | 6$\frac{1}{16}$ | 8$\frac{3}{8}$ | 370-420 | 75 |
| 56 | 254 | 154 | 212 | 10 | 6$\frac{1}{16}$ | 8$\frac{3}{8}$ | 350-505 | 90 |
| 57 | 205 | 183 | 177 | 8$\frac{1}{16}$ | 7$\frac{3}{16}$ | 6$\frac{15}{16}$ | 310 | 60 |
| 58 | 255 | 183 | 177 | 10$\frac{1}{16}$ | 7$\frac{3}{16}$ | 6$\frac{15}{16}$ | 245-540 | 75 |
| 58R | 255 | 183 | 177 | 10$\frac{1}{16}$ | 7$\frac{3}{16}$ | 6$\frac{15}{16}$ | 540-580 | 75 |
| 59 | 255 | 193 | 196 | 10$\frac{1}{16}$ | 7$\frac{11}{16}$ | 7$\frac{3}{4}$ | 540-590 | 100 |
| 60 | 332 | 160 | 225 | 13$\frac{1}{16}$ | 6$\frac{5}{16}$ | 8$\frac{7}{8}$ | 225-730 | 65-115 |
| 61 | 192 | 162 | 225 | 7$\frac{9}{16}$ | 6$\frac{3}{8}$ | 8$\frac{7}{8}$ | 310 | 60 |
| 62 | 225 | 162 | 225 | 8$\frac{7}{8}$ | 6$\frac{3}{8}$ | 8$\frac{7}{8}$ | 310-450 | 75 |
| 63 | 258 | 162 | 225 | 10$\frac{3}{16}$ | 6$\frac{3}{8}$ | 8$\frac{7}{8}$ | 450 | 90 |
| 64 | 296 | 162 | 225 | 11$\frac{5}{8}$ | 6$\frac{3}{8}$ | 8$\frac{7}{8}$ | 475-535 | 105-120 |
| 65 | 306 | 192 | 192 | 12$\frac{1}{16}$ | 7$\frac{9}{16}$ | 7$\frac{9}{16}$ | 600-850 | 130-165 |
| 66 | 306 | 192 | 194 | 12$\frac{1}{16}$ | 7$\frac{9}{16}$ | 7$\frac{11}{16}$ | 650-750 | 130-140 |
| 67R | 231 | 175 | 176 | 9$\frac{1}{8}$ | 6$\frac{15}{16}$ | 6$\frac{15}{16}$ | 390 | 65 |
| 70 | 208 | 180 | 186 | 8$\frac{3}{16}$ | 7$\frac{1}{16}$ | 7$\frac{5}{16}$ | 250-525 | 60-80 |
| 71 | 208 | 179 | 216 | 8$\frac{3}{16}$ | 7$\frac{1}{16}$ | 8$\frac{1}{2}$ | 275-450 | 75-90 |
| 72 | 230 | 179 | 210 | 9$\frac{1}{16}$ | 7$\frac{1}{16}$ | 8$\frac{1}{4}$ | 275-430 | 60-90 |
| 73 | 230 | 179 | 216 | 9$\frac{1}{16}$ | 7$\frac{1}{16}$ | 8$\frac{1}{2}$ | 425-500 | 80-115 |
| 74 | 260 | 184 | 222 | 10$\frac{1}{4}$ | 7$\frac{1}{4}$ | 8$\frac{3}{4}$ | 265-550 | 75-140 |
| 75 | 230 | 180 | 186 | 9$\frac{1}{16}$ | 7$\frac{1}{16}$ | 7$\frac{5}{16}$ | 245-690 | 90 |
| 76 | 334 | 179 | 216 | 13$\frac{1}{8}$ | 7$\frac{1}{16}$ | 8$\frac{1}{2}$ | 750-1075 | 150-175 |
| 77 | 306 | 184 | 222 | 12$\frac{1}{16}$ | 7$\frac{1}{4}$ | 8$\frac{3}{4}$ | 350-465 | 107-110 |
| 78 | 260 | 180 | 186 | 10$\frac{1}{4}$ | 7$\frac{1}{16}$ | 7$\frac{5}{16}$ | 465-800 | 105-115 |
| 79 | 307 | 179 | 188 | 12$\frac{1}{16}$ | 7$\frac{1}{16}$ | 7$\frac{3}{8}$ | 800-840 | 140 |
| 85 | 230 | 173 | 203 | 9$\frac{1}{16}$ | 6$\frac{13}{16}$ | 8 | 430-630 | 90 |
| 86 | 230 | 173 | 203 | 9$\frac{1}{16}$ | 6$\frac{13}{16}$ | 8 | 430-640 | 90 |
| 90 | 242 | 175 | 175 | 9$\frac{9}{16}$ | 6$\frac{15}{16}$ | 6$\frac{15}{16}$ | 450-650 | 80 |
| 91 | 278 | 175 | 175 | 11 | 6$\frac{15}{16}$ | 6$\frac{15}{16}$ | 520-700 | 100 |
| 92 | 315 | 175 | 175 | 12$\frac{7}{16}$ | 6$\frac{15}{16}$ | 6$\frac{15}{16}$ | 575-720 | 130 |
| 93 | 353 | 175 | 175 | 13$\frac{15}{16}$ | 6$\frac{15}{16}$ | 6$\frac{15}{16}$ | 600-800 | 150 |
| 94R | 315 | 175 | 190 | 12$\frac{7}{16}$ | 6$\frac{15}{16}$ | 7$\frac{1}{2}$ | 620-790 | 135 |
| 95R | 394 | 175 | 190 | 15$\frac{9}{16}$ | 6$\frac{15}{16}$ | 7$\frac{1}{2}$ | 760-950 | 190 |
| 96R | 242 | 175 | 175 | 9$\frac{1}{2}$ | 6$\frac{15}{16}$ | 6$\frac{15}{16}$ | 500-590 | 95 |
| 97R | 252 | 175 | 190 | 9$\frac{15}{16}$ | 6$\frac{15}{16}$ | 7$\frac{1}{2}$ | 575 | 90 |
| 98R | 283 | 175 | 190 | 11$\frac{1}{8}$ | 6$\frac{15}{16}$ | 7$\frac{1}{2}$ | 620-760 | 120 |
| 99 | 207 | 175 | 175 | 8$\frac{1}{8}$ | 6$\frac{15}{16}$ | 6$\frac{15}{16}$ | 360 | 50 |
| 99R | 210 | 175 | 175 | 8$\frac{5}{16}$ | 6$\frac{15}{16}$ | 6$\frac{15}{16}$ | 470 | 55-75 |
| 100 | 260 | 179 | 188 | 10$\frac{1}{4}$ | 7$\frac{1}{16}$ | 7$\frac{3}{8}$ | 770 | 115 |
| 101 | 260 | 179 | 170 | 10$\frac{1}{4}$ | 7$\frac{1}{16}$ | 6$\frac{11}{16}$ | 540 | 115 |
| 121R | 208 | 177 | 215 | 8$\frac{1}{4}$ | 7 | 8$\frac{1}{2}$ | 500-550 | 85 |
| 124R | 262 | 177 | 218 | 10$\frac{3}{8}$ | 7 | 8$\frac{5}{8}$ | 500-660 | 110 |
| 151R | 188 | 125 | 225 | 7$\frac{7}{16}$ | 4$\frac{15}{16}$ | 8$\frac{7}{8}$ | 270-335 | 55 |
| Heavy-Duty Commercial Batteries (12 Volt, 6 Cell) | | | | | | | | |
| 4D | 527 | 222 | 250 | 20$\frac{3}{4}$ | 8$\frac{3}{4}$ | 9$\frac{13}{16}$ | 600-1200 | 225-325 |
| 6D | 527 | 254 | 260 | 20$\frac{3}{4}$ | 10 | 10$\frac{1}{4}$ | 750 | 310 |
| 8D | 527 | 283 | 250 | 20$\frac{3}{4}$ | 11$\frac{1}{8}$ | 9$\frac{13}{16}$ | 700-1300 | 235-465 |
| 28 | 261 | 173 | 240 | 10$\frac{1}{4}$ | 6$\frac{13}{16}$ | 9$\frac{7}{16}$ | 500 | 80-135 |
| 29H | 334 | 171 | 232 | 13$\frac{1}{8}$ | 6$\frac{11}{16}$ | 9$\frac{1}{8}$ | 350-840 | 145 |
| 30H | 343 | 173 | 235 | 13$\frac{1}{2}$ | 6$\frac{13}{16}$ | 9$\frac{1}{4}$ | 370-1025 | 120-150 |
| 31A | 330 | 173 | 240 | 13 | 6$\frac{13}{16}$ | 9$\frac{7}{16}$ | 660-1000 | 100-200 |
| 31T | 330 | 173 | 240 | 13 | 6$\frac{13}{16}$ | 9$\frac{7}{16}$ | 620-1980 | 100-200 |

It should be noted that the above listing is not exhaustive, and other form factors and/or standards may be utilized. A number of variations may include, but are not limited to: rated voltages, capacity, application, the physical mounting requirements (which may vary for different original equipment manufacturers), the terminal types and configurations, the country or region, and so forth. Terminals may be placed, for example, in top, front, side or a combination of locations. Hold down ledges and features may similarly vary with the different enclosures.

Figure 3:
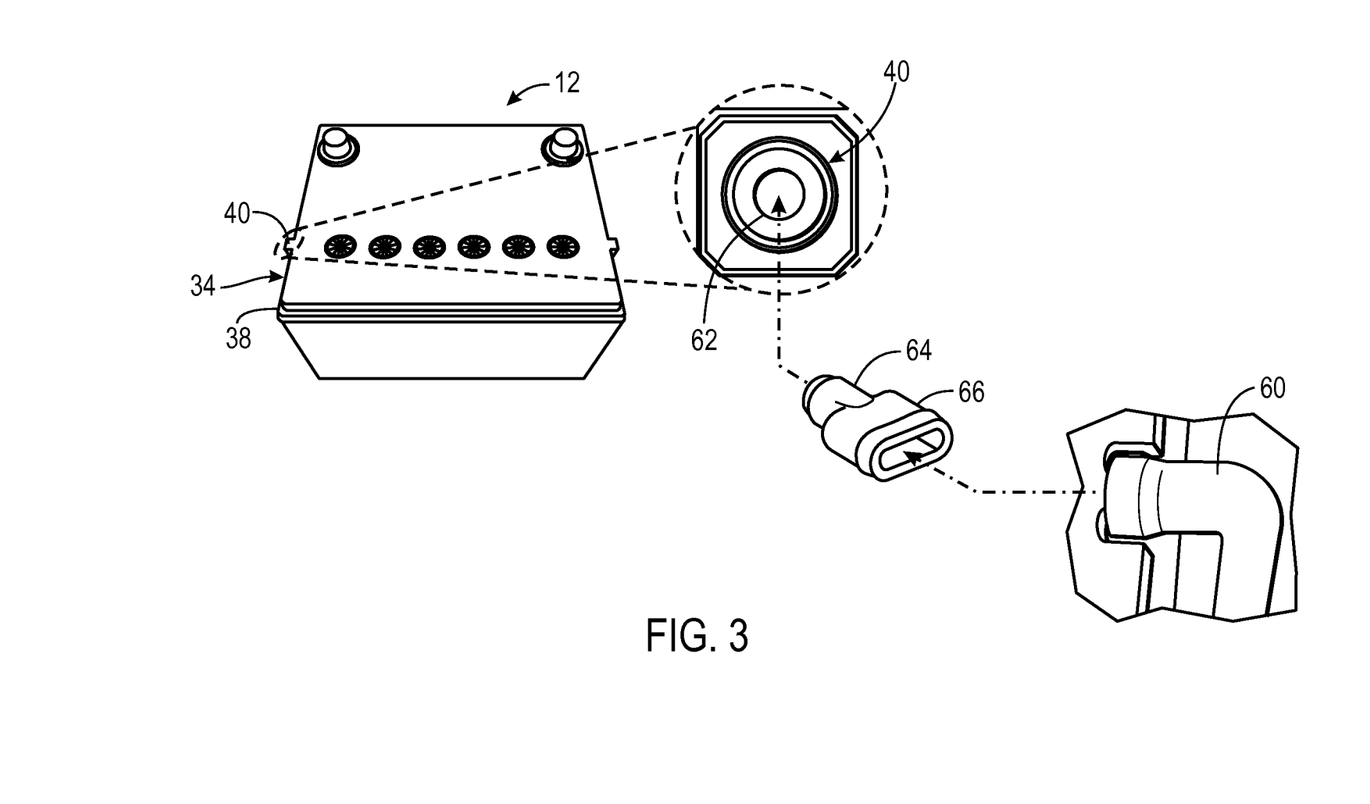
FIG. 3 is a representation of an embodiment of a Battery Council International (BCI) group 65 lead-acid battery and an embodiment of the manner in which the vent port of the group 65 lead-acid battery maybe adapted for use in a BCI group 66 application using an adapter configured in accordance with certain aspects of the present disclosure.

One particular application of the adapter 50 of the present embodiments is depicted in FIG. 3. Specifically, FIG. 3 is a perspective view of a group 65 embodiment of the battery 12 (e.g., a first group application battery), which includes at least one vent port 40 formed in the cover 38 of the housing 34 on one of the sides of the battery 12. As understood in the art, such a group 65 battery is, typically, only used in group 65 applications. However, embodiments of the adapter 50, configured in accordance with the present disclosure, enable the battery 12 of FIG. 3 to be used in group 66 applications as well (e.g., so as to be compatible with a second group application).

In particular, the embodiment of the adapter 50 of FIGS. 4-7, which is described in further detail below, enables the vent port 40 of the group 65 battery (e.g., the vent port 40 has a first geometry appropriate for a first group application) to be indirectly coupled to a vent hose 60 (e.g., a vent passage) of a group 66 application, as shown in FIG. 3 (e.g., a vent passage having a second geometry appropriate for a second group application), by changing the geometry of the structure that is ultimately fluidly coupled to the vent port 40.

Figure 4:
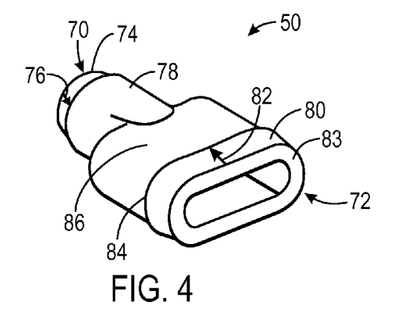
FIG. 4 is a perspective view of an embodiment of the adapter of FIG. 3, in accordance with certain aspects of the present disclosure.

Normally, the vent hose 60 of the group 66 application (e.g., the second group application) is incompatible with the vent port 40, which has a circular geometry 62. Specifically, the group 65 battery as illustrated utilizes a DIN-style vent hole having a 6 mm diameter, and the vent hose 60 is unable to couple with the vent port 40 in an appropriately mated relationship. The adapter 50, as schematically illustrated in FIG. 4, inserts into the circular geometry 62 in a first mated relationship, and couples with the vent hose 60 in a second mated relationship by way of one or more features that substantially match the geometry of the vent hose 60. In the schematic depiction of the adapter 50 in FIG. 3, a first protrusion 64 of the adapter 50 enables the first mated relationship and a second protrusion 66 of the adapter 50 enables the second mated relationship.

The adapter 50 may have further refined aspects of the first and second protrusions 64, 66 to enable the first and second mated relationships to be formed in a more secure fashion. The adapter 50 depicted in the perspective view of FIG. 4, for example, includes a first side 70 having a geometry that substantially matches the circular geometry 62 vent port 40 of FIG. 4 (e.g., a DIN-style 6 mm vent hole), and a second side 72 having a geometry that substantially matches the annular (or other) geometry of the vent hose 60. These sides generally correspond to the first and second protrusions 64 and 66, respectively, and they also generally have different geometries (shapes and sizes). More specifically, the first side 70 includes a vent port interface surface 74 of a generally circular geometry and having an annular taper 76 such that the vent port interface surface 74 is generally frusto-conical in shape. The annular taper 76 may enable the adapter 50 to securely fit within the vent port 40, for example via a friction/interference fit. In this way, the annular taper 76 may taper the vent port interface surface 74 from a first size (e.g., a first diameter) to a second size (e.g., a second diameter), where the first size is smaller than or substantially matches the size of the vent port 40, and the second size is substantially matched to or larger than the vent port 40 (e.g., has a diameter of approximately 6 mm). The annular taper 76 can also be seen in FIGS. 7 and 8.

Generally, any point between the first and second diameters of the annular taper 76 may enable an interference fit with the vent port 40. However, in one embodiment, the adapter 50 includes an annular neck region 78 of generally unchanging diameter extending from the annular taper 76 and also having the second diameter. The annular neck region 78 may enable the adapter 50 to have a greater surface area with which to interface with the vent port 40, among other advantages. In certain embodiments, such as when the vent port 40 is sufficiently deformable (e.g., a softer material than the adapter 50), the second diameter may be larger than the vent port 40 so as to enable a stronger interference fit between the annular neck region 78 and the vent port 40.

Contrasting the second side 72 with the first side 70, the adapter 50 includes a vent passage interface surface 80, which has a geometry that substantially matches with the vent hose 60 (FIG. 3). In the illustrated embodiment, the vent passage interface surface 80 has an ellipsoidal geometry having a size that enables the second side 72 to be inserted into and secured within the vent hose 60 (e.g., via an interference fit). The vent passage interface surface 80 also includes a taper 82, which transitions the vent passage interface surface 80 from a first respective geometry to a second respective geometry, the first respective geometry having a size that is smaller than, or substantially matched with, an internal geometry of the vent hose 60, and the second respective geometry having a size that is substantially matched with, or larger than, the internal geometry of the vent hose 60.

Specifically, the first respective geometry may correspond to a front face 83 of the adapter 50, and the second respective geometry may correspond to a lip portion 84 having a geometry that is larger than the vent hose 60 so as to resist retraction of the vent hose 60 away from the adapter 50. In other words, the lip portion 84 may act as a catch to maintain connection between the adapter 50 and the vent hose 60. The lip portion 84 may be desirable in embodiments where the vent hose 60 is sufficiently pliable so as to enable the lip portion 84 to protrude into the thickness of the vent hose 60 and thereby act as a retention mechanism.

An obround neck region 86 (e.g., an ellipsoidal region) joins the annular neck region 78 and the vent passage interface surface 80. Specifically, the obround neck region 86 has an outer geometry that is substantially the same as the outer geometry of the front face 83. The geometry of the obround neck region 86 may be smaller than, or substantially matched to, the inner geometry of the vent hose 60. Further, the obround neck region 86 enables a greater surface area with which to contact or overlap with the vent hose 60, and also includes an internal transition in venting geometry, which is described in further detail below with respect to FIG. 7.

Figure 5:
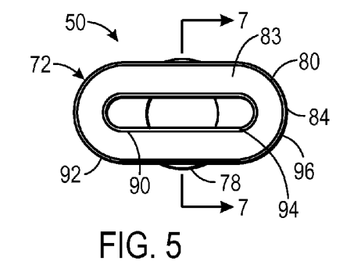
FIG. 5 is a front view of the embodiment of the adapter of FIG. 4, in accordance with certain aspects of the present disclosure.

A front view of the group 65 battery adapter 50 is provided in FIG. 5. As shown, the changes in size at the second side 72 of the adapter 50, as well as the internal and external surfaces thereof, appear as concentric ellipses having different minor and major diameters. The differences in the venting geometries is also represented, and can be more clearly seen in FIG. 7, which is described in further detail below.

The view provided in FIG. 5 also shows the respective major and minor diameters of the second side 72 of the adapter 50. In particular, the respective minor and major diameters of the features positioned on the second side 72 of the adapter include minor and major diameters of inner and outer surfaces 90, 92 of the front face 83, and inner and outer surfaces 94, 96 of different portions of the vent passage interface surface 80. While not labeled in the drawing, the minor diameters may be considered to run top to bottom, and the major diameters may be considered to run left to right. As depicted, the inner surface 90 tapers inward such that its minor and major diameters decrease in a direction moving from the second side 72 to the first side 70. In other words, a portion of a flow path of vented gases from the battery 12 defined by the inner surface 90 increases in size in the direction of vent flow.

Figure 6:
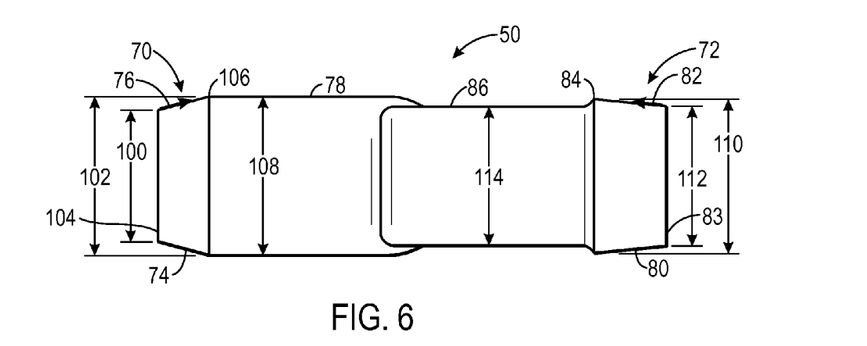
FIG. 6 is a side view of an embodiment of the adapter of FIGS. 4 and 5, in accordance with certain aspects of the present disclosure.

FIG. 6 is a side view of the adapter 50 of FIGS. 3-5. In particular, FIG. 6 depicts the side of the adapter 50 (the adapter is symmetrical so that both sides are substantially the same), and various outer diameters associated with the features described above with respect to FIG. 4. Thus, as described herein with respect to FIG. 6, all diameters are considered to be outer diameters. As shown from left to right, the annular taper 76 of the vent port interface surface 74 transitions the surface 74 from having a first outer diameter 100 to a second outer diameter 102, the second outer diameter 102 also corresponding to an outer diameter at the annular neck region 78. Due to this transition, the vent port interface surface 74 may be considered to have a rear face 104 and an elbow portion 106 corresponding to the respective positions of the first and second outer diameters 100, 102.

In some embodiments, the annular neck region 78 may have a third outer diameter 108 that is smaller than the second outer diameter 102, for example such that the second outer diameter 102 forms a lip that may be used as a retaining member as set forth above with respect to the lip portion 84. It should be noted, however, that any relative sizing of the second and third outer diameters is encompassed by the present embodiments. Thus, the third outer diameter 108 may be substantially the same size, larger than, or smaller than the second outer diameter 102, and may be substantially the same size, larger than, or smaller than the first outer diameter 100.

Moving now from right to left in FIG. 6 and referring to the second side 72 of the adapter 50, as noted above, the taper 82 transitions the vent passage interface surface 80 from the front face 83 having a first respective geometry to the lip portion 84 having a second respective geometry. Because the second side 72 of the adapter 50 has obround (e.g., elliptical) outer geometries, the vent passage interface surface 80 and the obround neck region 86 have outer major and minor diameters, as discussed above with respect to FIG. 5. In the illustrated side view, only the minor diameters are labeled (the major diameters run crosswise through the page). With this in mind, the taper 82 may be considered to transition the vent passage interface surface 80 from a first minor outer diameter 110 to a second minor outer diameter 112, where the second is larger than the first. The second minor outer diameter 112, again, may be substantially the same as, or larger than, a minor inner diameter of the vent hose 60 (FIG. 3), while the first minor outer diameter 110 may be substantially the same as, or smaller than, a minor inner diameter of the vent hose 60.

The obround neck region 86 includes a third minor outer diameter 114, which may have any relative size relationship to the second and third minor outer diameters 112, 114. In the illustrated embodiment, the third minor outer diameter 114 is substantially the same as the first minor outer diameter 110, and is smaller than the second minor outer diameter 112. In certain embodiments, the third minor outer diameter 114 may be sized to enable the obround neck region 86 to maintain an interference fit with the vent hose 60. Further, it should be noted that the major outer diameters of the obround (e.g., elliptical) portions of the adapter 50 may generally follow the minor outer diameters described above so as to maintain the geometrical relationships described above.

Figure 7:
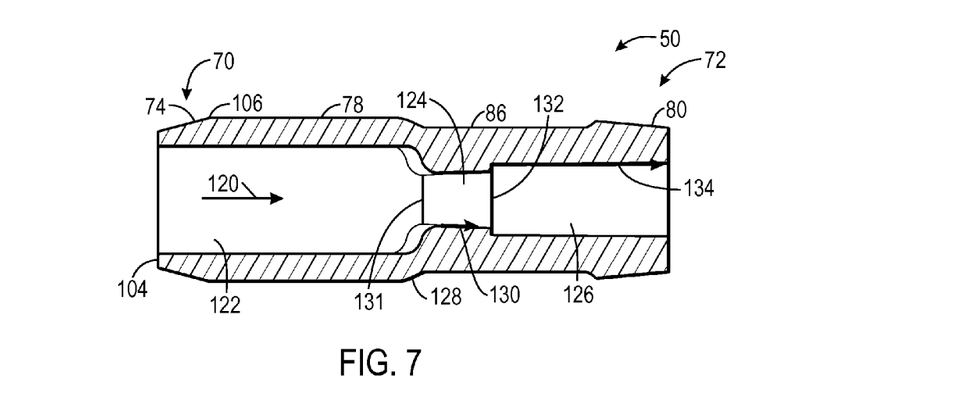
FIG. 7 is a cross-sectional side view of an embodiment of the adapter of FIGS. 4-6, in accordance with certain aspects of the present disclosure.

An embodiment of an internal vent path 120 formed by the inner surfaces of the adapter 50 is depicted in FIG. 7, which is a cross-sectional side view of the adapter 50. As shown, the internal vent path 120 is configured to flow vented gases from the battery 12 in a direction generally from the first side 70 to the second side 72. The illustrated internal vent path 120 does not follow the geometrical relationships set forth above with respect to the outer surfaces of the adapter 50 (e.g., the vent port interface surface 74 being tapered, the obround neck region 86 not being tapered, and so forth). However, such geometrical relationships are intended to be within the scope of the present disclosure. The internal vent path 120 instead includes, moving from left (the first side 70) to right (the second side 72), a first portion 122, a second portion 124, and a third portion 126 all having geometries that are different from one another.

The first portion 122, as depicted, has a generally unchanging geometry and extends from the rear face 104, through the elbow portion 106 and the annular neck region 78, and terminates at a transition 128 between the annular neck region 78 and the obround neck region 86. The first portion 122 of the internal vent path 120 may generally have any geometry, and in the illustrated embodiment has an annular geometry with a substantially unchanging diameter. However, in other embodiments, the first portion 122 may be tapered, may have a different shape (e.g., obround, square), or a combination thereof.

As depicted, the second portion 124 has a position corresponding to a portion of the obround neck region 86, and is generally smaller in size relative to the first and third portions 122, 126. The second portion 124 may be annular or elliptical, or any other shape, and may or may not be tapered. In the illustrated embodiment, the second portion 124 has a taper 130, the degree of which may depend on the relative sizes of the first, second, and third portions 122, 124, 126, desired effect on the vented gases, or any combination thereof. In embodiments where the taper 130 is obround (e.g., elliptical), the taper 130 may be along only the minor diameter of the second portion 124, only along the major diameter of the second portion, or along both the minor and major diameters of the second portion 124.

Regarding the size of the second portion 124 relative to the first portion 122, the second portion 124 may have a surface area taken at any point along its axial length (along the direction illustrated by arrow 120) that is between approximately 10% and 90% of the surface area of the first portion 122. By way of non-limiting example, the taper 130 may be such that the surface area of the second portion 124 varies from a first percentage to a second percentage of the surface area of the first portion 122, the first percentage being between approximately 10% and approximately 60%, and the second percentage being between approximately 20% and 90%.

Though the taper 130 of the second portion 124 may be of any degree, it may be desirable for the taper 130 to be such that an upstream end 131 of the second portion 124 has a surface area that is between approximately 50% and approximately 95% of the surface area of a downstream end 132 of the second portion 124. Further, in some embodiments, the downstream end 132 may have a surface area that is smaller than the surface area, taken at a point along its length, of the first portion 122.

The internal vent path 120 transitions from the second portion 124 to the third portion 126 within the obround neck region 86, as illustrated. However, it should be noted that this transition may occur at other locations, such as at the lip portion 84, or any other location (e.g., closer to the second side 72 than the first side 70). The third portion 126 may have any geometry, such as obround, annular, or the like. In the illustrated embodiment, the third portion 126 is obround (e.g., elliptical) and is generally larger in size (e.g., as measured by the surface area of the portions at a point along their length) than the second portion 124. The third portion 126 may or may not be tapered. As depicted, the third portion 126 includes a taper 132 that causes an increase in the minor diameter of the third portion 126 along its length. In certain embodiments, the taper 132 may also increase the major diameter of the third portion 126 along its length. Indeed, in general, the taper 132 may increase the major and/or minor diameters of the third portion 126 along its length.

Again, the adapter 50 discussed above with respect to FIGS. 3-7 may be particularly useful for enabling a group 65 battery to be used in a group 66 battery application by enabling the vent port 40 of the group 65 battery to couple with the vent hose 60 of a group 66 battery application. In this regard, the present embodiments also relate to other group batteries having other vent port geometries and solves other technical problems. Another embodiment and associated application of the adapter 50 is depicted schematically in FIG. 8. Specifically, the embodiment of the adapter 50 depicted in FIG. 8 may be configured to enable an embodiment of the battery 12, such as a BCI group 24F battery, to have a locking key venting configuration.

Figure 8:
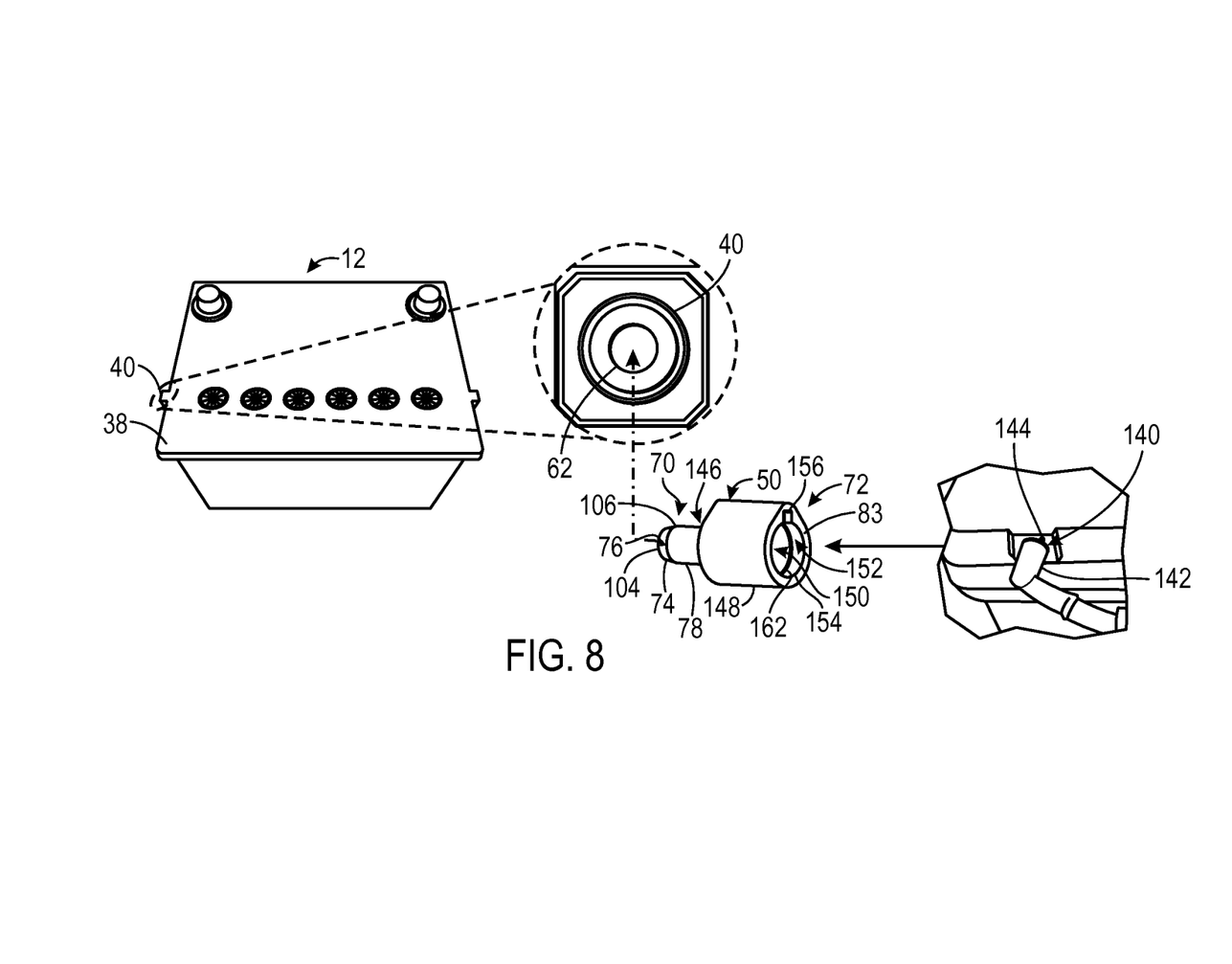
FIG. 8 is a representation of an embodiment of a BCI group 24F lead-acid battery and an embodiment of the manner in which the vent port of the group 24F lead-acid battery maybe adapted for use in combination with keyed vent tubes using an adapter configured in accordance with certain aspects of the present disclosure.
Figure 9:
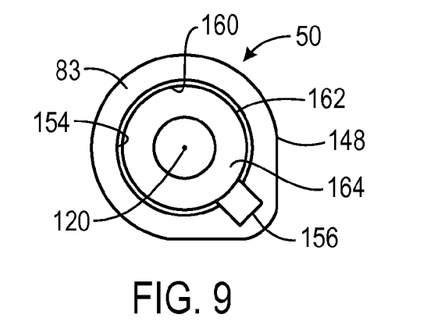
FIG. 9 is a front view of the embodiment of the adapter of FIG. 8, in accordance with certain aspects of the present disclosure.

As depicted in FIG. 8, the embodiment of the battery 12 (e.g., a group 24 F battery) includes the vent port 40 formed in the cover 38 in a similar manner as set forth above with respect to the group 65 battery example described above. Indeed, as with the group 65 battery, the illustrated battery 12 of FIG. 8 includes an embodiment of the vent port 40 having a DIN-style 6 mm opening, which has a circular geometry 62. However, it is presently recognized that group 24F batteries such as these may also be appropriate for use in other applications where a vent tube may not be compatible with the vent port 40. For example, such a group 24F battery may be able to be used in another application that requires a locking key vent configuration 140, such as shown on the right side of FIG. 8.

In accordance with certain embodiments of the present disclosure, the adapter 50 may have a configuration that enables a first mated relationship with the vent port 40 having the circular/annular geometry 62, and a second mated relationship with a keyed vent tube 142. The keyed vent tube 142 may be considered to be keyed due to the inclusion of a protrusion 144 having a particular geometry that appropriately mates with a corresponding female connector. However, it is also within the scope of the present disclosure for the protrusion 144 to instead be on the adapter 50 and the female connector portion to be on the vent tube.

As illustrated, the embodiment of the adapter 50 includes an embodiment of the first side 70 having a geometry generally configured to correspond with the geometry of the vent port 40. For example, the first side 146 may include an embodiment of the vent port interface surface 74 and an embodiment of the annular neck region 78, both of which may interface with the vent port 40 so as to enable an interference fit with the vent port 40. Indeed, the vent port interface surface 74 and the annular neck region 78 of FIGS. 8-11 may be configured in a similar manner and have generally the same geometric relationships with the vent port 40 and one another as set forth above with respect to the adapter 50 of FIGS. 3-7. In this way, the description associated with the vent port interface surface 74 and the annular neck region 78 illustrated in FIGS. 3-7 is also intended to be applicable to their counterparts shown in FIGS. 8-11, where appropriate.

The embodiment of the adapter 50 in FIGS. 8-11 may also include an embodiment of the elbow portion 106 positioned at the interface between the vent port interface surface 74 and the annular neck region 78, which may also have a similar configuration as set forth above with respect to FIGS. 3-7. The elbow portion 106 may, in certain embodiments, have a size that is substantially matched to the size of the circular geometry 62 (e.g., 6 mm in diameter) such that the elbow 106 at least partially causes the adapter 50 to be secured within the vent port 40 by a friction/interference fit. It should also be noted that in certain embodiments, there may be no elbow 106 for the adapter 50 of FIGS. 3-7 or FIGS. 8-11, and the taper 76 may instead extend from the rear end 104 of the adapter 50 and to an upstream end 146 of the annular neck region 78. The upstream end 146 can be more clearly seen in FIG. 10.

Unlike the adapter 50 of FIGS. 3-8, the embodiment of the adapter 50 in FIGS. 8-11 includes an ovoid body 148 having a cross-sectional geometry of an oval extending from the upstream end 146 of the annular neck region 78 and to an embodiment of the front face 83. However, it is also within the scope of the present disclosure for the ovoid body 148 to instead be an annular shape or some other polygonal, curved, or complex geometry. Indeed, the ovoid body 148 (or variations thereof) may only be required to enable housing of the connection features described below. However, it is presently recognized that the form factor of the ovoid body 148 may generally correspond to the internal connection features to save materials and correspondingly reduce costs, size, weight, and the like.

In further contrast to the embodiment of the adapter 50 of FIGS. 3-8, the adapter 50 of FIGS. 8-11 does not have a male mating connector on the second side 72, but instead has a female mating connector 150 configured to receive the keyed vent tube 142. The ovoid body 148 may be of any size appropriate to enable the formation of the female mating connector 150 and its associated features. For example, the keyed tube 142 may have a diameter of its curved portion of approximately 8 mm, and one or more portions of the female mating connector 150 may have a size that is substantially matched (e.g., a curved portion having a diameter of approximately 8 mm).

Specifically, the female mating connector 150 of the adapter 50 may be considered to define or include an internal portion of the adapter 50 that is configured to hold the keyed vent tube 142. The illustrated female mating connector 150 includes a keyed region 152 having a specific geometry corresponding to the keyed configuration of the keyed vent tube 142. The keyed region 152 has a complex surface in which a curve 154, represented as an arc having an arc angle of less than 360 degrees (e.g., between approximately 300 degrees and approximately 350 degrees), is joined at its ends by a second geometry to form a key opening 156, which may have a cross-sectional appearance of a square, rectangle, triangle, or other polygon, or another curved shape. Generally, the surface area defined by the second geometry of the key opening 156 will be smaller than the surface area defined by the curve 154, and the keyed region 152 will have a shape that is substantially the same as the keyed vent tube 142.

Figure 10:
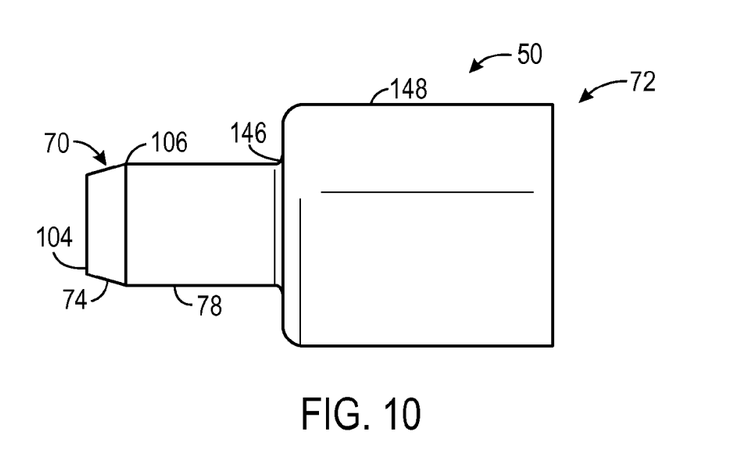
FIG. 10 is a side view of the embodiment of the adapter of FIG. 8, in accordance with certain aspects of the present disclosure.
Figure 11:
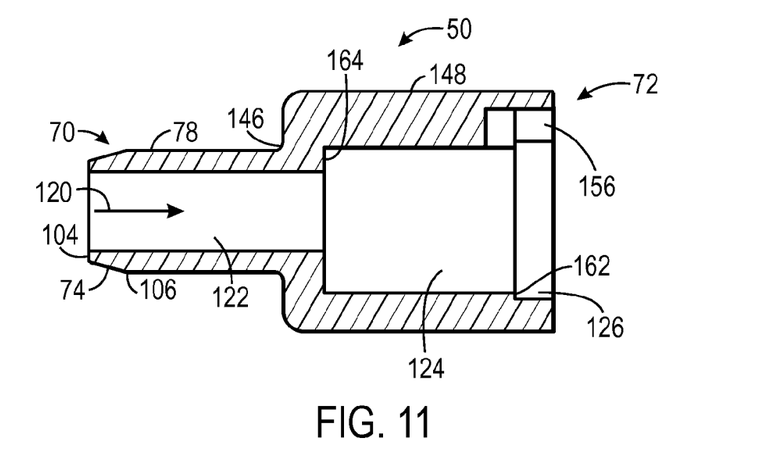
FIG. 11 is a cross-sectional side view of the embodiment of the adapter of FIG. 8, in accordance with certain aspects of the present disclosure.

As shown in FIGS. 8, 10, and 11, the ovoid body 148 does not have a changing size along its length (e.g., does not have a taper in the axial direction of the adapter 50). However, the female mating connector 150 may include internal features having a taper or other features to enable a secure fit with the keyed vent tube 142. For example, as shown in the front view of FIG. 9 and the cross-sectional side view of FIG. 11, the keyed region 152 includes a stepped configuration in which an additional curve 160 is disposed within the internal vent path 120 of the adapter 50, and the additional curve 160 has a smaller cross-sectional surface area compared to the curve 154. The arc angle of the additional curve 160 may be the same or different than the curve 154, but in the illustrated embodiment is substantially the same. This can be seen as a small decrease in the size of the female mating connector 150, which forms a step 162, in FIGS. 8, 9, and 11. Another step 164 can be seen in FIGS. 9 and 11, which corresponds to a transition between an embodiment of the first and second portions 122, 124 of the internal vent path 120 of the adapter 50.

Referring now to the cross-sectional side view of FIG. 11, the embodiments of the first, second, and third portions 122, 124, 126 of the internal vent path 120 are illustrated as having generally increasing cross-sectional surface areas moving from the first side 70 to the second side 72. As shown, the first, second, and third portions 122, 124, 126 of the internal vent path 120 provide an incremental increase in the size of the internal vent path 120.

The sizes of the second and third portions 124, 126 are also configured to facilitate securement of the keyed vent hose 142. For example, the third portion 126 in FIG. 11 may be sized to enable the keyed vent hose 142 to be inserted into the female mating connector 150 with a first, relatively low application force while also requiring the protrusion 144 to be positionally matched with the key opening 156. In this way, the protrusion 144 and the key opening 156 cause the keyed vent tube 142 and the adapter 50 to have a predetermined orientational relationship in order to appropriately form a mated connection (e.g., via an interference fit). Thus, the third portion 126 may have a cross-sectional geometry that is larger (e.g., between approximately 0.1% larger and approximately 10% larger) than the cross-sectional geometry of the keyed vent tube 142, as determined by the size of the curve 154 and the key opening 156. In this and/or other embodiments, the third portion 126 may be substantially matched in size to the keyed vent tube 142.

To continue inserting the keyed vent tube 142 into the second portion 124, a second insertion force, greater than the first insertion force, may be required by virtue of the size of the second portion 124 relative to the keyed vent tube 142. Thus, in some embodiments, the second portion 124 may have a cross-sectional geometry that is substantially matched to, or smaller than, the cross-sectional geometry of the keyed vent tube 142. By way of non-limiting example, the cross-sectional surface area of the second portion 124 may be between approximately 90% and approximately 99% of the cross-sectional surface area of the keyed vent tube 142.

While the first portion 122 of the internal vent path 120 of FIG. 11 has substantially the same geometric configuration as set forth above with respect to the first portion 122 of FIG. 7, the first portion 122 of FIG. 11 extends from the rear face 104 and into a section of the internal vent path 120 corresponding to the ovoid body 148. The second portion 124 and the third portion 126, as shown, extend for the remainder of the internal vent path 120.

Configurations for the internal vent paths 120 other than those explicitly shown in FIGS. 7 and 11 are also possible and are considered to be within the scope of the present disclosure. For example, the internal vent path 120 may include only one portion, only two portions, or three or more portions. Each portion of the internal vent path 120 may have any geometry, may or may not have a taper, and may have any size relative to the external geometry of the adapter 50. However, it is presently recognized that the configurations specifically illustrated and described herein may have certain benefits and solve technical issues that may not necessarily be addressed by other configurations.

Further, other configurations for the outer geometries of the adapter 50 are also within the scope of the present disclosure. For example, as illustrated in FIGS. 12 and 13, certain embodiments of the adapter 50 may be configured to enable a change in venting position of certain batteries. Specifically, the embodiments illustrated in FIGS. 12 and 13 include a battery system 180 having multiple batteries 12 of a particular BCI group (e.g., group 31 batteries), each of the batteries 12 having the same location for their respective vent ports 40. The group 31 batteries 12, as illustrated, all have their respective vent ports 40 positioned proximate their respective third electrochemical cell 182, which corresponds in position to the third circle from the bottom of FIG. 12.

In certain applications, the batteries 12 may all be secured within a vehicle using, among other things, a hold down bar 184 or similar feature placed over the covers 38 of the batteries 12. As illustrated, the hold down bar 184 may span across all of the batteries 12 at substantially the same position as the vent ports 40, which may create difficulty in connecting vent tubes 186 due to spatial constraints.

Figure 12:
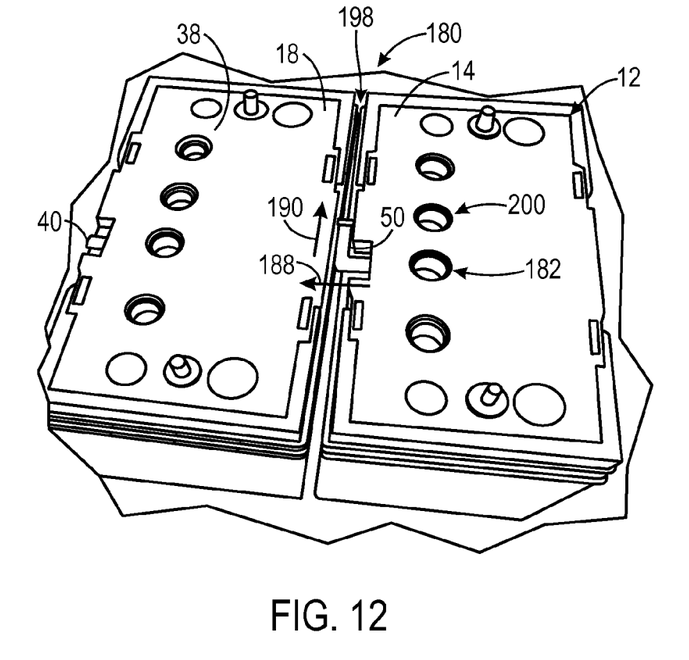
FIG. 12 is a schematic representation of the manner in which an adapter configured in accordance with certain aspects of the present disclosure may be used to adjust a venting position of a bank of BCI group 31 lead-acid batteries used in commercial applications.
Figure 13:
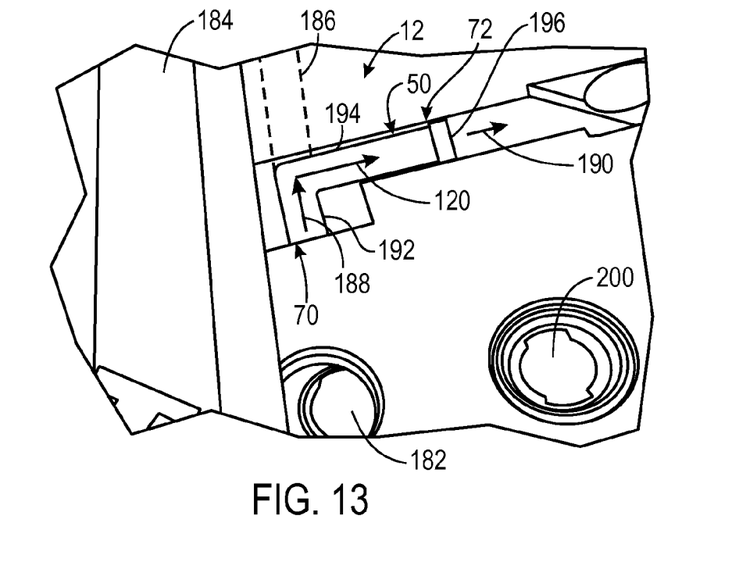
FIG. 13 is an expanded view of a portion of the schematic representation of FIG. 12 including the adapter.

In accordance with an aspect of the present embodiments, the illustrated embodiment of the adapter 50 of FIGS. 12 and 13 may couple to the vent port 40 of one of the batteries 12, may extend from the vent port 40 in a first direction 188, and may turn to enable vented gases to be directed in a second direction 190. The second direction 190 may generally be considered to be crosswise relative to the first direction 188 (e.g., perpendicular), and may turn in a direction other than the direction illustrated in FIG. 13.

The adapter 50 of FIGS. 12 and 13 has a first portion 192 corresponding to the first direction 188, and a second portion 194 corresponding to the second direction 190, where the first portion 192 is disposed on the first side 70 that mates with the vent port 40, and the second portion 194 is disposed on the second side 72 that mates with a vent tube 196 (the full tube is not shown). The first and second portions 192, 194 may include, independently (i.e., they may be the same or different), female or male connectors. The first portion 192 is configured to fit over and mate with the vent port 40 of the battery 12 (e.g., via a friction/interference fit). The illustrated vent ports 40 include a protrusion and associated opening for venting gases from the battery 12. Depending on its size relative to the vent tube 196, the second portion 194 may fit over and mate with the vent tube 196 as a female connector, or may be insertable into the vent tube 196 as a male connector. In this regard, the first portion 192, the second portion 194, or a combination thereof, of the adapter 50 of FIGS. 12 and 13 may include any one or a combination of the internal and external geometric features and relationships set forth above with respect to the adapters in FIGS. 3-11. In certain configurations, for example, the first portion 192 and the second portion 194 may be different geometric shapes.

In the illustrated embodiment, the adapter 50 may be sized so as to fit within a tolerance 198 (e.g., an opening or crevice) disposed between the respective covers 38 of adjacent batteries 12. This may enable the adapter 50 to fit on the vent ports 40 on the first side 70 and couple to vent tubes that are not capable of being appropriately (e.g., optimally) fitted directly onto the vent ports 40 due to a lack of available space. Specifically, the first portion 192 may be sized so as to extend into the tolerance 198, and the second portion 194 may be sized so as to extend within the tolerance 198 in an appropriate direction (e.g., the second direction 190). In certain embodiments, the size of the adapter 50 enables gases to be vented off of a fourth electrochemical cell 200, which generally corresponds in position to the fourth circle from the bottom of FIG. 12.

One or more of the disclosed embodiments, alone or on combination, may provide one or more technical effects useful in the production, installation, and use of lead-acid batteries for multiple applications. For example, certain embodiments of the present approach may enable reduced costs associated with the manufacture of batteries, such as by reducing or eliminating the need for different battery groups whose main difference is the position and/or geometry of their venting mechanisms. In addition, certain embodiments of the present approach also enable certain batteries, heretofore suitable for only a single application, to be suitable for more than one application by enabling a single group battery to be compatible with the requirements of other battery groups (e.g., BCI groups). The technical effects and technical problems in the specification are examples and are not limiting. It should be noted that the embodiments described in the specification may have other technical effects and can solve other technical problems.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation. Further, although individual embodiments are discussed herein, the disclosure is intended to cover all combinations of these embodiments.

The invention claimed is:

1. A lead-acid battery system comprising a lead acid battery, and a vent adapter coupled to a vent port of the lead-acid battery, wherein the vent adapter comprises:
   a first side comprising a first connector having a first cross-sectional geometry along the first side and mated via a first interference fit with the vent port of the lead-acid battery, wherein the vent port is configured to vent gases evolved from the lead-acid battery; and
   a second side in fluid communication with the first side and comprising a second connector having a second cross-sectional geometry along the second side configured to mate with a vent passage of an automobile, wherein the first and second cross-sectional geometries have respective shapes that are different from one another.

2. The lead-acid battery system of claim 1, wherein the first cross-sectional geometry of the first connector is shaped and sized to mate with the vent port of the lead-acid battery in the first interference fit.

3. The lead-acid battery system of claim 1, wherein the second cross-sectional geometry of the second connector is an outer surface geometry shaped and sized to be inserted into and mate with the vent passage of the automobile in a second interference fit.

4. The lead-acid battery system of claim 1, wherein the second cross-sectional geometry of the second connector is an inner surface geometry shaped and sized to extend about and mate with the vent passage of the automobile in a second interference fit.

5. The lead-acid battery system of claim 4, wherein the inner surface geometry comprises a receptacle having a complex geometric shape configured to receive a keyed vent tube of the automobile.

6. The lead-acid battery system of claim 5, wherein the complex geometric shape comprises an annular portion and a polygonal portion that partially overlap with one another.

7. The lead-acid battery system of claim 5, wherein the receptacle of the inner surface geometry comprises a first portion and a second portion coextensive with the first portion, the first and second portions both having generally the same complex geometric shape but having different size proportions, and wherein the first portion is configured to require a first insertion force of the keyed vent tube to insert the vent tube into the vent adapter, and the second portion is configured to require a second insertion force greater than the first to continue inserting the vent tube into the vent adapter.

8. The lead-acid battery system of claim 1, comprising an internal venting passage having a first portion, a second portion, and a third portion each defined by different internal surface geometries of the vent adapter.

9. The lead-acid battery system of claim 8, wherein the second portion is located between the first and third portions along the internal venting passage, and the second portion is smaller than the first and second portions.

10. The lead-acid battery system of claim 1, wherein the lead-acid battery is a Battery Council International (BCI) group 65 or group 24F lead-acid battery, and wherein the first connector of the vent adapter comprises an outer surface having a frusto-conical portion and an annular neck portion coextensive with one another, and at least a part of the frusto-conical portion, the annular neck portion, or both, are substantially matched in diameter with the vent port of a Battery Council International (BCI) group 65 or group 24F lead-acid battery to enable the first connector to be inserted into the vent port to produce the first interference fit.

11. The lead-acid battery system of claim 10, wherein the second connector comprises an obround outer surface having major and minor diameters that substantially match with a vent tube of a BCI group 66 application to enable the second connector to be inserted into the vent tube to produce a second interference fit.

\* \* \* \* \*

UNITED STATES PATENT AND TRADEMARK OFFICE
CERTIFICATE OF CORRECTION

PATENT NO. : 10,193,113 B2
APPLICATION NO. : 14/337479
DATED : January 29, 2019
INVENTOR(S) : Juds et al.

Page 1 of 1

It is certified that error appears in the above-identified patent and that said Letters Patent is hereby corrected as shown below:

On the Title Page

1. In Lines 1-2 of Item (73), under "Assignee", in Column 1, delete "Johnson Controls Techology Company," and insert --Johnson Controls Technology Company,--, therefor.

In the Specification

2. In Column 3, Line 6, delete "DRAWINGS" and insert --BRIEF DESCRIPTION OF THE DRAWINGS--, therefor.

3. In Column 21, Lines 5-6, delete "on combination," and insert --in combination,--, therefor.

In the Claims

4. In Column 21, Line 53, in Claim 1, delete "comprising a lead acid" and insert --comprising a lead-acid--, therefor.

Signed and Sealed this
Twenty-sixth Day of March, 2019

Andrei Iancu
*Director of the United States Patent and Trademark Office*